(12) United States Patent
Nomura et al.

(10) Patent No.: US 7,602,410 B2
(45) Date of Patent: *Oct. 13, 2009

(54) APPARATUS FOR AND METHOD OF FORMING IMAGE USING OSCILLATION MIRROR

(75) Inventors: Yujiro Nomura, Nagano-ken (JP); Ken Ikuma, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/235,068

(22) Filed: Sep. 22, 2008

(65) Prior Publication Data

US 2009/0052916 A1 Feb. 26, 2009

Related U.S. Application Data

(63) Continuation of application No. 11/150,848, filed on Jun. 9, 2005, now Pat. No. 7,443,414.

(30) Foreign Application Priority Data

Jun. 9, 2004 (JP) .............................. 2004-170831
Jun. 9, 2004 (JP) .............................. 2004-170832

(51) Int. Cl.
 *B41J 2/435* (2006.01)
 *B41J 2/47* (2006.01)

(52) U.S. Cl. ....................... 347/250; 347/235

(58) Field of Classification Search ................ 347/231, 347/235, 243, 250, 259, 260; 359/202, 212–214
See application file for complete search history.

(56) References Cited

U.S. PATENT DOCUMENTS

| 4,814,791 A | 3/1989 | Ohara et al. |
| 4,996,540 A | 2/1991 | Motoi et al. |
| 5,880,766 A | 3/1999 | Murakami et al. |
| 5,930,019 A | 7/1999 | Suzuki et al. |
| 6,038,051 A | 3/2000 | Suzuki et al. |
| 6,172,788 B1 | 1/2001 | Suzuki et al. |
| 6,476,370 B1 | 11/2002 | Suzuki et al. |
| 6,483,529 B1 | 11/2002 | Ito et al. |
| 6,756,583 B2 | 6/2004 | Yamawaki ................. 250/234 |

(Continued)

FOREIGN PATENT DOCUMENTS

EP 0326411 8/1989

(Continued)

*Primary Examiner*—Hai C Pham
(74) *Attorney, Agent, or Firm*—Hogan & Hartson LLP

(57) ABSTRACT

As a scanning light beam which is scanning and traveling away from an effective image region moves passed the location of a sensor, a horizontal synchronizing signal Hsync is obtained as a first detection signal. A deflection mirror surface turns around, thereby reversing the direction in which the scanning light beam scans. This scanning light beam therefore scans an effective image region IR, and a latent image forming operation using this scanning light beam is controlled based on the horizontal synchronizing signal Hsync. Hence, there is a relatively long period of time (T4+T5) since the horizontal synchronizing signal Hsync is obtained until formation of a latent image starts in accordance with the signal Hsync. This secures sufficient time for control of the latent image forming operation based on the horizontal synchronizing signal Hsync, and hence, realizes the latent image forming operation as desired during the time T6.

1 Claim, 12 Drawing Sheets

U.S. PATENT DOCUMENTS

| | | | |
|---|---|---|---|
| 6,844,951 B2 | 1/2005 | Cannon et al. | 359/223 |
| 7,423,787 B2 | 9/2008 | Nakajima | |
| 7,443,414 B2 * | 10/2008 | Nomura et al. | 347/250 |
| 2006/0243886 A1 | 11/2006 | Nomura et al. | 250/208.1 |

FOREIGN PATENT DOCUMENTS

| | | |
|---|---|---|
| JP | 59-075760 | 4/1984 |
| JP | 63-102545 | 5/1988 |
| JP | 05-276336 | 10/1993 |
| JP | 07-151986 | 6/1995 |
| JP | 08-136838 | 5/1996 |
| JP | 09-085988 | 3/1997 |
| JP | 09-193449 | 7/1997 |
| JP | 09-193463 | 7/1997 |
| JP | 09230276 A | 9/1997 |
| JP | 10-232357 | 9/1998 |
| JP | 2001215426 A | 8/2001 |
| JP | 2003-025629 | 1/2003 |

* cited by examiner

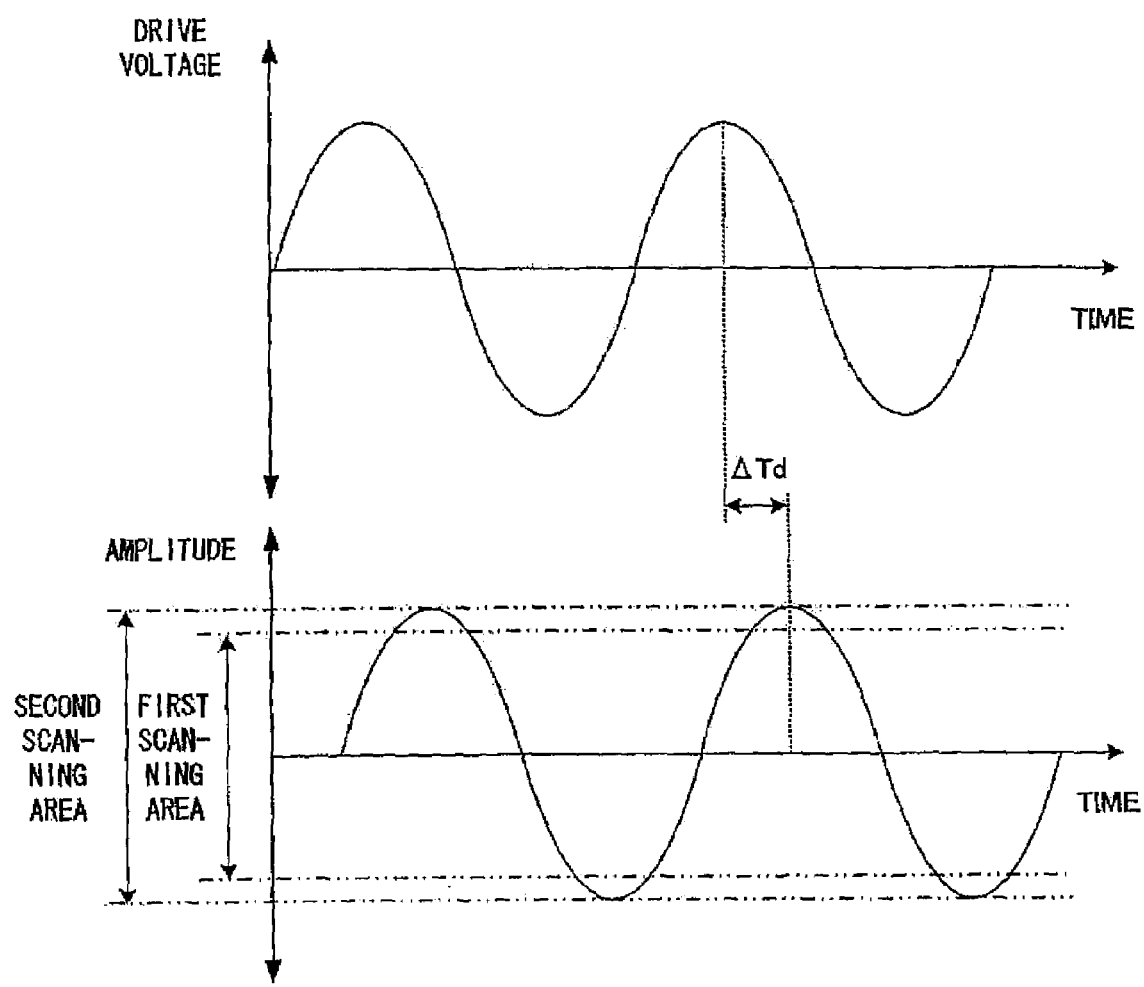
F I G. 6

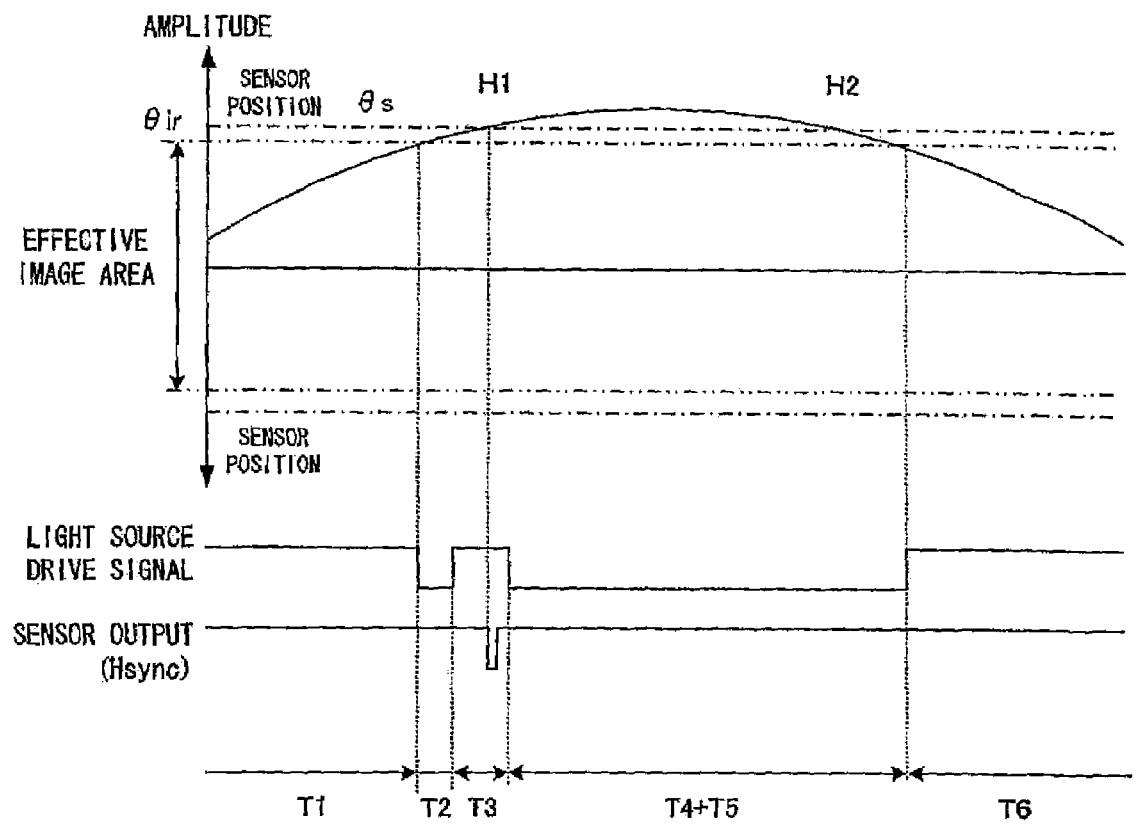
FIG. 7A: TIMING CHART OF THE OPERATION IN THE VICINITY OF SENSORS
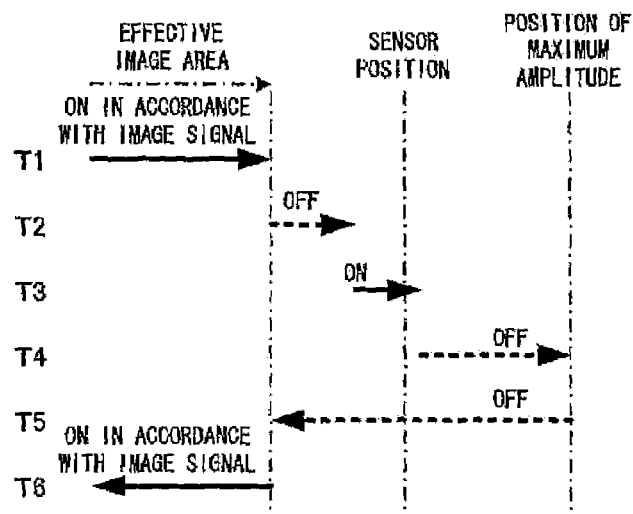
FIG. 7B: ON/OFF OF LASER IN THE VICINITY OF SENSORS FIG. 9A: TIMING CHART OF THE OPERATION IN THE VICINITY OF SENSORS
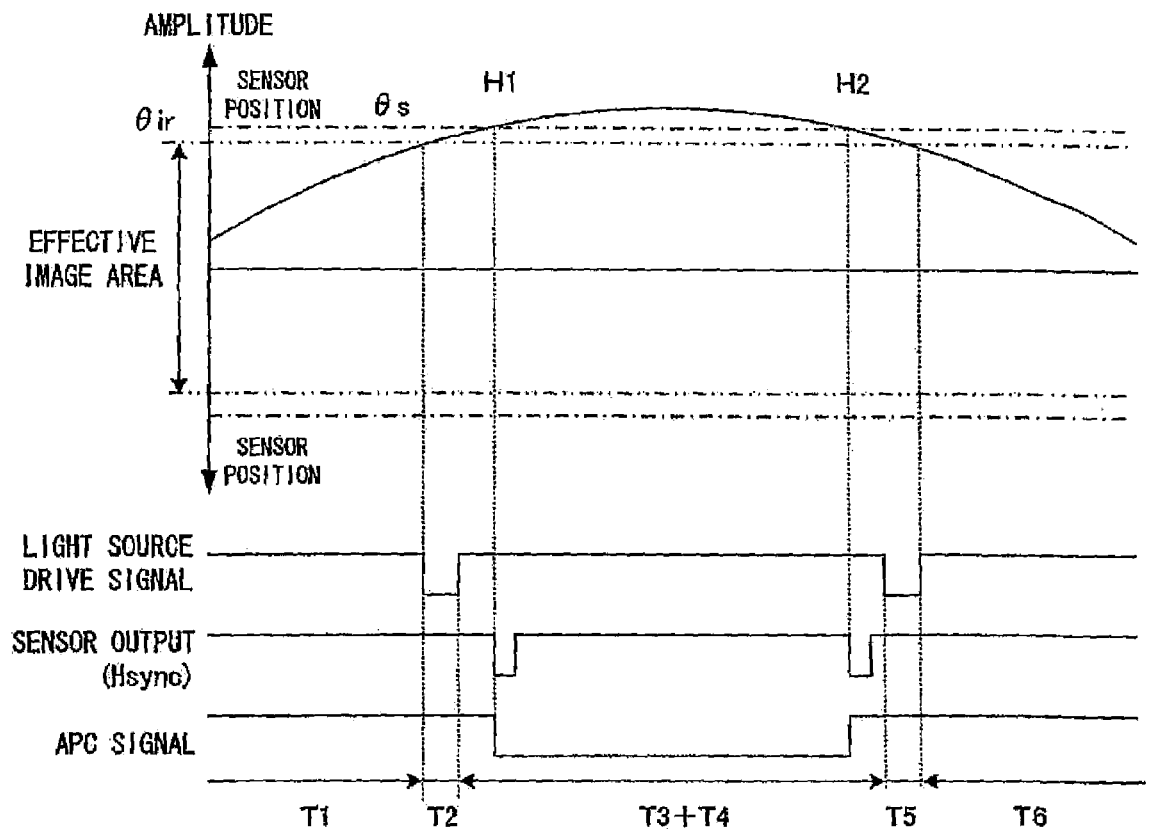
FIG. 9B: ON/OFF OF LASER IN THE VICINITY OF SENSORS
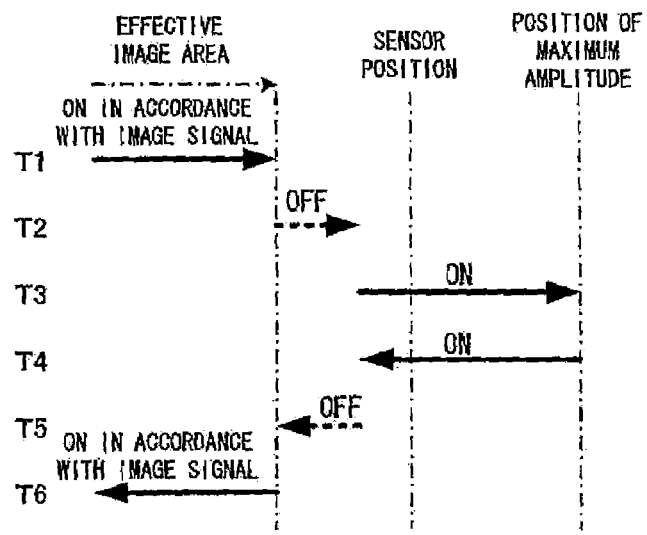

FIG. 11A : TIMING CHART OF THE OPERATION IN THE VICINITY OF SENSORS
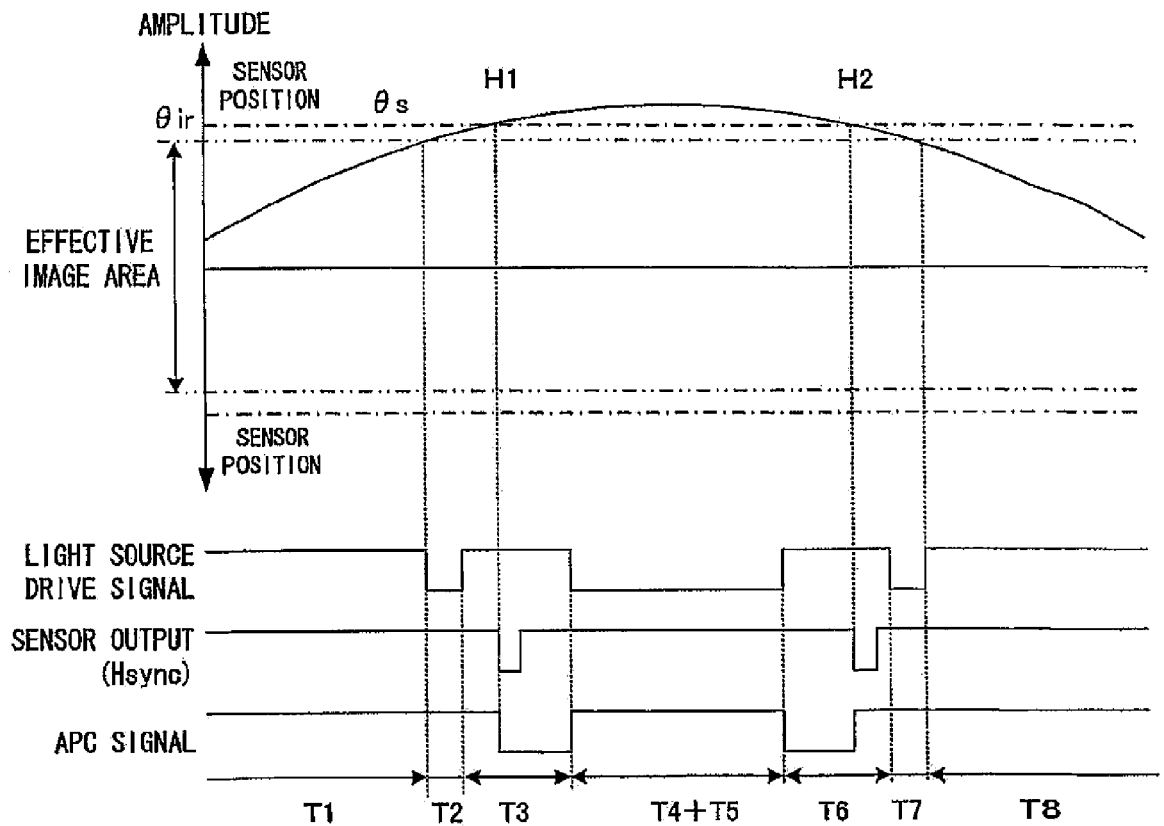
FIG. 11B : ON/OFF OF LASER IN THE VICINITY OF SENSORS
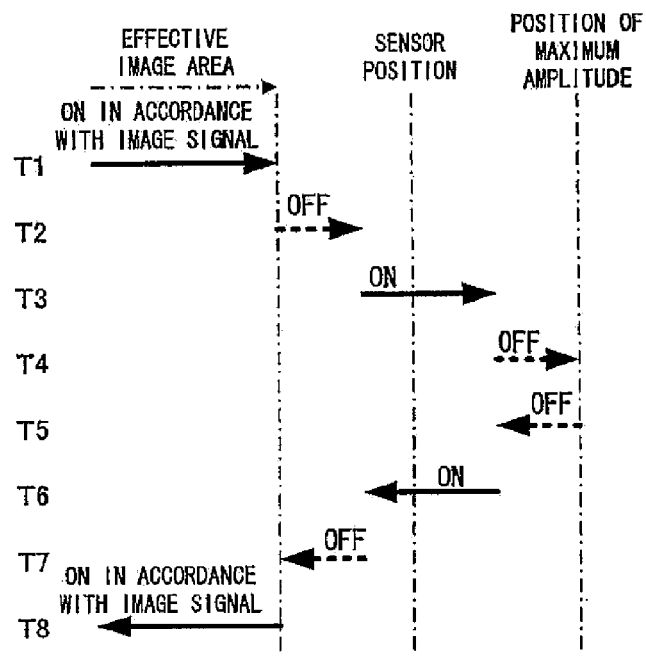

APPARATUS FOR AND METHOD OF FORMING IMAGE USING OSCILLATION MIRROR

CROSS REFERENCE TO RELATED APPLICATION

This application is a continuation of application Ser. No. 11/150,848, filed Jun. 9, 2005, which is incorporated herein by reference. This application also claims priority under 35 USC 119 to the Japanese Patent Applications enumerated below, the specification, drawings and claims of each of which is incorporated herein by reference in its entirety:
No. 2004-170831 filed Jun. 9, 2004; and
No. 2004-170832 filed Jun. 9, 2004.

BACKGROUND OF THE INVENTION

1. Field of the Invention

The present invention relates to an image forming apparatus, an image forming method and a light amount adjusting method within the apparatus. In the apparatus, a deflecting mirror or a oscillation mirror makes a light beam from a light source scan on an effective image region of a latent image carrier, thereby forming a latent image in the effective image region.

2. Description of the Related Art

In a known apparatus, a deflector deflects a light beam emitted from a light source, the light beam scans on a latent image carrier such as a photosensitive drum and a latent image is formed. In the image forming apparatus described in Japanese Patent Application Laid-Open Gazette No. S63-102545, No. H5-276336 or the like for instance, a semiconductor laser is used as a light source, and the semiconductor laser emits a light beam having a light intensity which corresponds to an image signal. After deflected by a deflector such as a polygon mirror, the light beam modulated in this manner is guided to a latent image carrier via an optical element such as a lens and scans on the latent image carrier along a main scanning direction. As a result, a latent image corresponding to the image signal is formed on the latent image carrier.

Further, in this image forming apparatus, an optical detection sensor such as a photosensor is disposed on a scanning path of the light beam, for the purpose of forming a favorable image. In short, the optical detection sensor detects that the light beam scans passed the starting point of the scanning path, and based on the result of the detection, the timing to start optical modulation is adjusted. In this conventional apparatus, the starting point at which the light beam starts scanning is detected in this manner and a latent image forming operation is accordingly controlled.

In addition, this image forming apparatus comprises an APC circuit to approximately coincide a light amount of the light beam emitted from the semiconductor laser with a reference light amount. The APC circuit compares the reference light amount determined in advance with the amount of the emitted light beam detected by a photo diode built in the semiconductor laser, and controls such that the amount of the light beam coincides with the reference light amount. To be more specific, feeding of an initial pulse which is for activation of the semiconductor laser initiates adjustment of the amount of the light emitted from the semiconductor laser so that the light amount coincides with the reference light amount. This light amount adjusting operation is executed during a period in which the light beam scans one line. When the amount of the emitted light becomes equal to the reference light amount, the light amount adjustment is stopped, and a latent image is formed line by line through light modulation. The light modulation is performed by controlling turning on and off of the semiconductor laser in accordance with the image signal. During this, the amount of the emitted light beam is equal to the reference light amount when the semiconductor laser is ON but zero when the semiconductor laser is OFF.

Upon creation of the latent image for one page, the APC circuit executes the light amount adjustment once again and matches the amount of the light from the semiconductor laser with the reference light amount. After the light amount adjustment is stopped, a latent image for next one page is formed.

SUMMARY OF THE INVENTION

By the way, an image forming apparatus which uses an oscillation mirror rather than a polygon mirror as a deflector is known. In such an apparatus as well, the starting point where the light beam starts scanning may be detected for control of the latent image forming operation as in the conventional apparatus described above. However, the control should preferably consider an operation characteristic. That is, with respect to a light beam deflected by a polygon mirror, it is possible to move the light beam only in a direction which corresponds to the direction of rotations of the polygon mirror but it is not possible for the light to scan in the opposite direction. In contrast, where an oscillation mirror is used, a light beam can reciprocally move in a main scanning direction. Control of the latent image forming operation utilizing such a characteristic is therefore desirable. For example, in this type of image forming apparatus, an effective image region, namely, an area where a latent image is to be formed is defined in advance on a latent image carrier. An optical detection sensor detects a light beam before the light beam arrives at the effective image region. And then, based on the result of the detection, various types of control is implemented such as setting of the timing to modulate the light, confirmation of the operation performed by the deflector and detection of an error. Hence, for favorable execution of this latent image forming operation, it is desirable that there is a long time since the optical detection sensor detects the light beam until the light beam reaches the effective image region.

For the apparatus which uses the polygon mirror to meet this requirement, the distance between the optical detection sensor and the effective image region needs be long. Increase of this distance however necessitates enlarging the scanning area of the polygon mirror and therefore inevitably leads to increase of the sizes of optical components including the polygon mirror and optical elements and the size of the apparatus.

Meanwhile, as a solution to various problems associated with use of a polygon mirror as a deflector, an apparatus equipped with an oscillation mirror which is manufactured using a micro machining technique has been proposed. In this apparatus, as an optical deflector, a driver coil, a deflection mirror surface and a ligament are formed within a frame all of which are one integrated structure obtained by photolithographic processing, etching and the like of a substrate made of crystal, glass, silicon, etc. When a driver applies a voltage upon the driver coil, the deflection mirror surface oscillates about an oscillation axis which is approximately orthogonal to a main scanning direction, whereby a light beam incident upon the deflection mirror surface is deflected. Further, in the case of an oscillation mirror of this type, to secure a wide scanning area, the frequency of a drive signal fed to the driver coil is almost the same as the resonant frequency of the oscillation mirror, and at this frequency, the deflection mirror surface is made to resonate. Due to this, a change of the resonant frequency caused by a change in an environment where the oscillation mirror is used, e.g., a change in temperature deviates the resonant frequency from the drive frequency and changes the oscillation amplitude. In the event that an oscillation mirror which resonates is used, it is therefore particularly important for a favorable latent image forming operation to confirm that the oscillation mirror oscillates without fail and to securely notice any change of the oscillation amplitude. The conventional techniques however do not sufficiently address these issues.

While the light beam successively scans the latent image carrier to form a latent image for one page in the conventional apparatus above, the APC circuit does not adjust the amount of light during this. In short, a latent image is formed based upon the assumption that the amount of the light emitted from the semiconductor laser remains unchanged while the light scans for one page. Despite this, it is difficult to perfectly prevent the amount of the emitted light from changing, and a change of the amount of light is sometimes influential.

A primary object of the present invention is to realize favorable execution of a latent image forming operation within an image forming apparatus in which a light beam emitted from a light source scans on an effective image region of a latent image carrier and a latent image is formed in the effective image region.

Other object of the present invention is to adjust the amount of the light beam while a latent image is being formed through successive scanning with the light beam and to thereby stably form the latent image.

The present invention is directed to an image forming apparatus, a method of forming an image using the apparatus and a method of adjusting an amount of light within the apparatus. The image forming apparatus comprises: a latent image carrier which has an effective image region over a predetermined width along a main scanning direction; and a latent image forming section which using a deflection mirror surface which oscillates, makes a light beam from a light source scan a second scanning area which is wider than a first scanning area which corresponds to the effective image region along the main scanning direction, and guides the scanning light beam in the first scanning area toward the effective image region, thereby forming a latent image in the effective image region.

According to a first aspect of the present invention, a first light beam which is scanning and traveling away from the effective image region is detected. The operation of forming a latent image is controlled in accordance with the result of detection of the first light beam.

According to a second aspect of the present invention, while the light beam moves outside the first scanning area but within the second scanning area, the amount of this light beam is adjusted.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIG. 6 is a graph which shows a relationship between a mirror drive signal and amplitude of a deflection mirror surface;

FIGS. 7A and 7B are drawings of the sensing operation of sensing the scanning light beam in the image forming apparatus which is shown in FIG. 1;

FIGS. 9A and 9B are drawings of a sensing operation of sensing a scanning light beam and the light amount adjusting operation in the second embodiment;

FIGS. 11A and 11B are drawings of a sensing operation of sensing a scanning light beam and the light amount adjusting operation in the third embodiment.

DETAILED DESCRIPTION OF THE PREFERRED EMBODIMENTS

Figure 1:
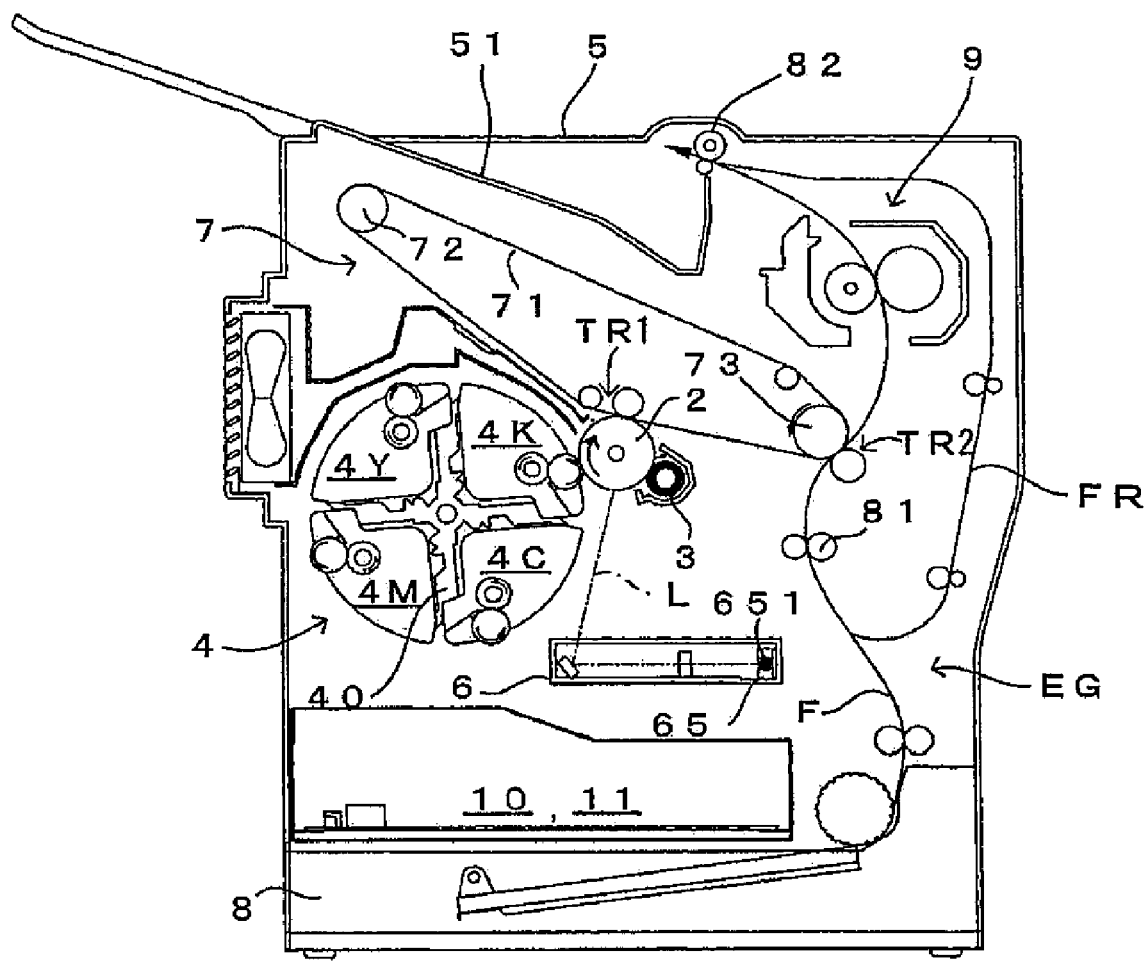
FIG. 1 is a drawing which shows a first embodiment of an image forming apparatus according to the present invention.
Figure 2:
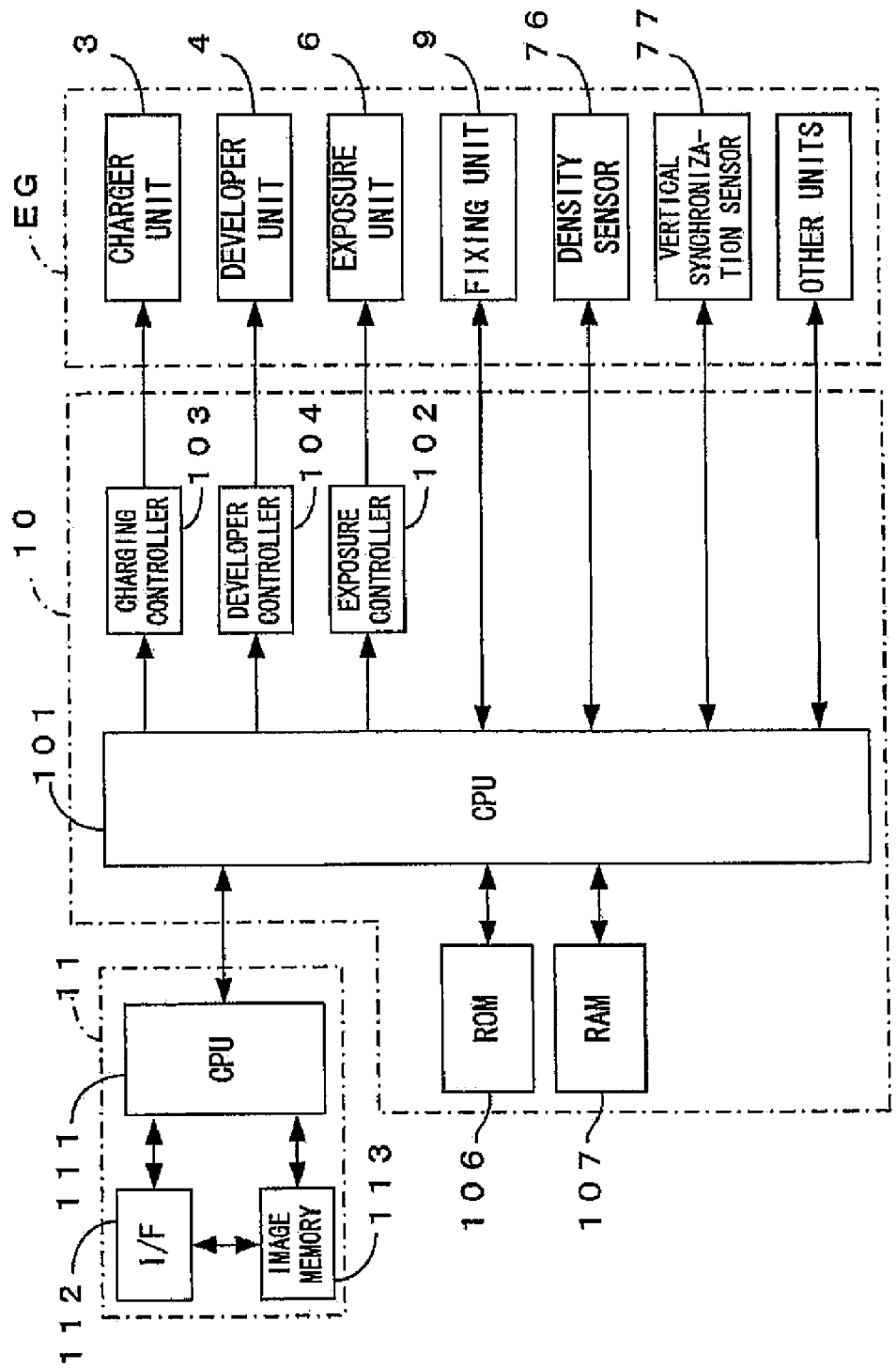
FIG. 2 is a block diagram which shows the electric structure of the image forming apparatus which is shown in FIG. 1.

FIG. 1 is a drawing which shows a first embodiment of an image forming apparatus according to the present invention. FIG. 2 is a block diagram which shows the electric structure of the image forming apparatus which is shown in FIG. 1. This image forming apparatus is a color printer of the so-called 4-cycle type. In this image forming apparatus, when a print command is fed to a main controller 11 from an external apparatus such as a host computer in response to a user's image formation request, an engine controller 10 controls respective portions of an engine part EG in accordance with the print instruction received from the main controller 11 of a CPU 111, and an image which corresponds to the print instruction is formed on a sheet which may be a copy paper, a transfer paper, a plain paper or a transparency for an overhead projector.

In the engine part EG, a photosensitive member 2 is disposed so that the photosensitive member 2 can freely rotate in the arrow direction (sub scanning direction) shown in FIG. 1. The photosensitive member 2 corresponds to a latent image carrier of the present invention. Around the photosensitive member 2, a charger unit 3, a rotary developer unit 4 and a cleaner (not shown) are disposed along the direction in which the photosensitive member rotates. A charging controller 103 is electrically connected with the charger unit 3, for application of a predetermined charging bias upon the charger unit 3. The bias application uniformly charges an outer circumferential surface of the photosensitive member 2 to a predetermined surface potential. The photosensitive member 2, the charger unit 3 and the cleaner form one integrated photosensitive member cartridge which can be freely attached to and detached from a main body 5 as one integrated unit.

An exposure unit 6 emits a light beam L toward the outer circumferential surface of the photosensitive member 2 thus charged by the charger unit 3. The exposure unit 6 makes the light beam L scan on the photosensitive member 2 based on an electric signal from an exposure controller which will be described later, whereby an electrostatic image which reflects an image signal is formed. The exposure unit 6 is thus a latent image forming section according to the present invention, and the structure and operations of the exposure unit will be described in detail later.

The developer unit 4 develops thus formed electrostatic latent image with toner. In other words, in this embodiment, the developer unit 4 comprises a support frame 40 which is axially disposed for free rotations, and also a yellow developer 4Y, a magenta developer 4M, a cyan developer 4C and a black developer 4K which house toner of the respective colors and are formed as cartridges which are freely attachable to and detachable from the support frame 40. The developer unit 4 is driven into rotations in response to a control command given from a developer controller 104 of the engine controller 10. When the developers 4Y, 4C, 4M and 4K are selectively positioned at a predetermined developing position which abuts on the photosensitive member 2 or is faced with the photosensitive member 2 over a predetermined gap, toner of the color corresponding to the selected developer is supplied onto the surface of the photosensitive member 2 by a developer roller 44 which carries the toner of the selected color. As a result, the electrostatic latent image on the photosensitive member 2 is visualized in the selected toner color.

A toner image developed by the developer unit 4 in the manner above is primarily transferred onto an intermediate transfer belt 71 of a transfer unit 7 in a primary transfer region TR1. The transfer unit 7 comprises the intermediate transfer belt 71 which runs across a plurality of rollers 72, 73, etc., and a driver (not shown) which drives the roller 73 into rotations to thereby rotate the intermediate transfer belt 71 in a predetermined rotation direction.

Further, there are a transfer belt cleaner (not shown), a density sensor 76 (FIG. 2) and a vertical synchronization sensor 77 (FIG. 2) in the vicinity of the roller 72. Of these, the density sensor 76 is disposed facing a surface of the intermediate transfer belt 71 and measures the optical density of a patch image formed on an outer circumferential surface of the intermediate transfer belt 71. Meanwhile, the vertical synchronization sensor 77 is a sensor which detects a reference position of the intermediate transfer belt 71, and serves as a vertical synchronization sensor for obtaining a synchronizing signal outputted in relation to rotations of the intermediate transfer belt 71 in the sub scanning direction, namely, a vertical synchronizing signal Vsync. In this apparatus, for the purpose of aligning the timing at which the respective portions operate and accurately overlaying toner images of the respective colors on top of each other, the respective portions of the apparatus operate under the control of the vertical synchronizing signal Vsync.

For transfer of color images on sheets, the toner images of the respective colors formed on the photosensitive member 2 are overlaid each other on the intermediate transfer belt 71, thereby forming color images which will then be secondarily transferred onto sheets taken out one by one from a cassette 8 and transported on a transportation path F to a secondary transfer region TR2.

At this stage, in order to properly transfer the images carried by the intermediate transfer belt 71 onto a sheet at a predetermined position, the timing of feeding the sheet to the secondary transfer region TR2 is controlled. To be specific, there is a gate roller 81 disposed in front of the secondary transfer region TR2 on the transportation path F, and as the gate roller 81 rotates in synchronization to the timing of rotations of the intermediate transfer belt 71, the sheet is fed into the secondary transfer region TR2 at predetermined timing.

Further, the sheet now bearing the color image is transported to a discharge tray part 51, which is disposed to a top surface portion of the main body 5, through a fixing unit 9 and a discharge roller 82. When images are to be formed on the both surfaces of a sheet, the discharge roller 82 moves the sheet seating an image on its one surface in the manner above in a switch back motion. The sheet is therefore transported along a reverse transportation path FR. While the sheet is returned back to the transportation path F again before arriving at the gate roller 81, the surface of the sheet which abuts on the intermediate transfer belt 71 in the secondary transfer region TR2 and is to receive a transferred image is, at this stage, the opposite surface to the surface which already bears the image. In this fashion, it is possible to form images on the both surfaces of the sheet.

In FIG. 2, denoted at 113 is an image memory disposed in the main controller 11 for storage of image data fed from an external apparatus such as a host computer via an interface 112. Denoted at 106 is a ROM which stores a computation program executed by a CPU 101, control data for control of the engine part EG, etc. Denoted at 107 is a RAM which temporarily stores a computation result derived by the CPU 101, other data, etc.

Figure 3:
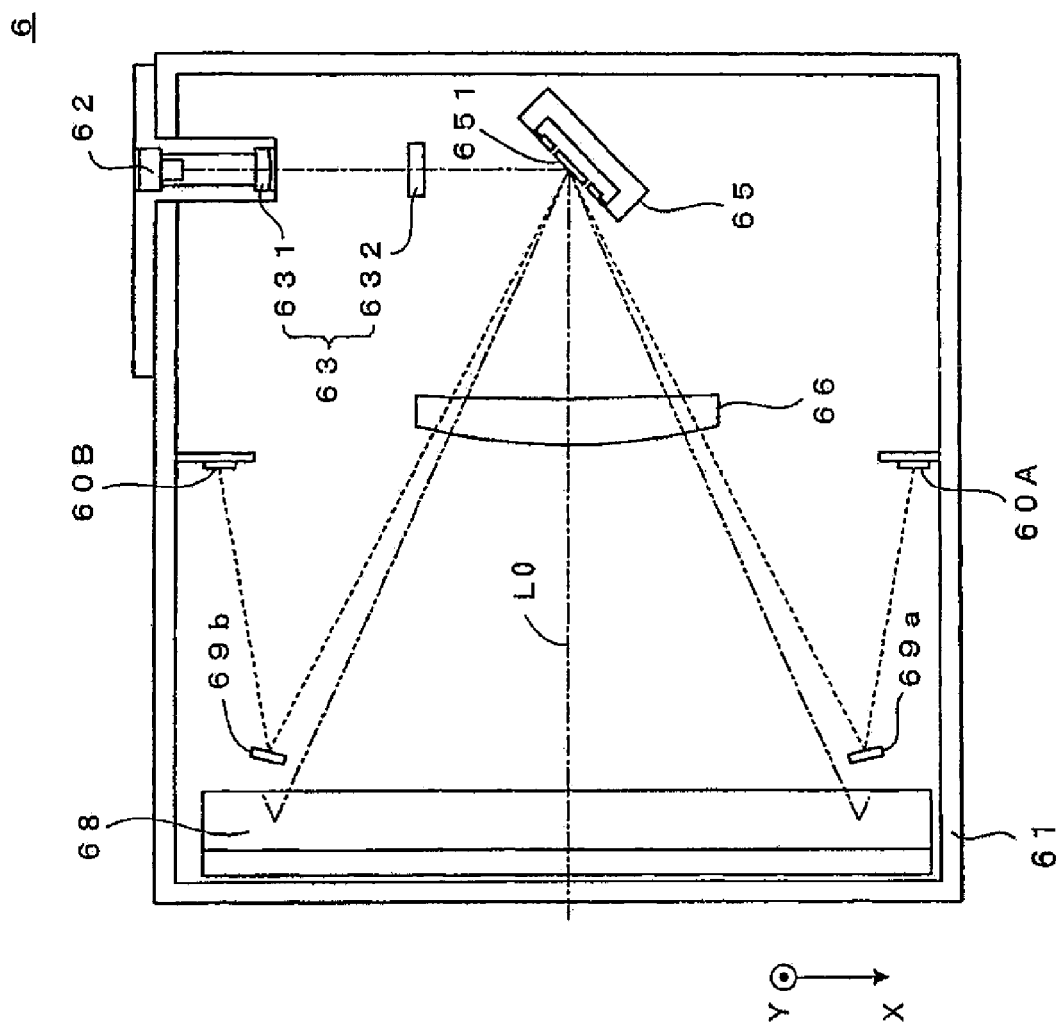
FIG. 3 is a main-scanning cross sectional view showing the structure of the exposure unit which is disposed in the image forming apparatus which is shown in FIG. 1.
Figure 4:
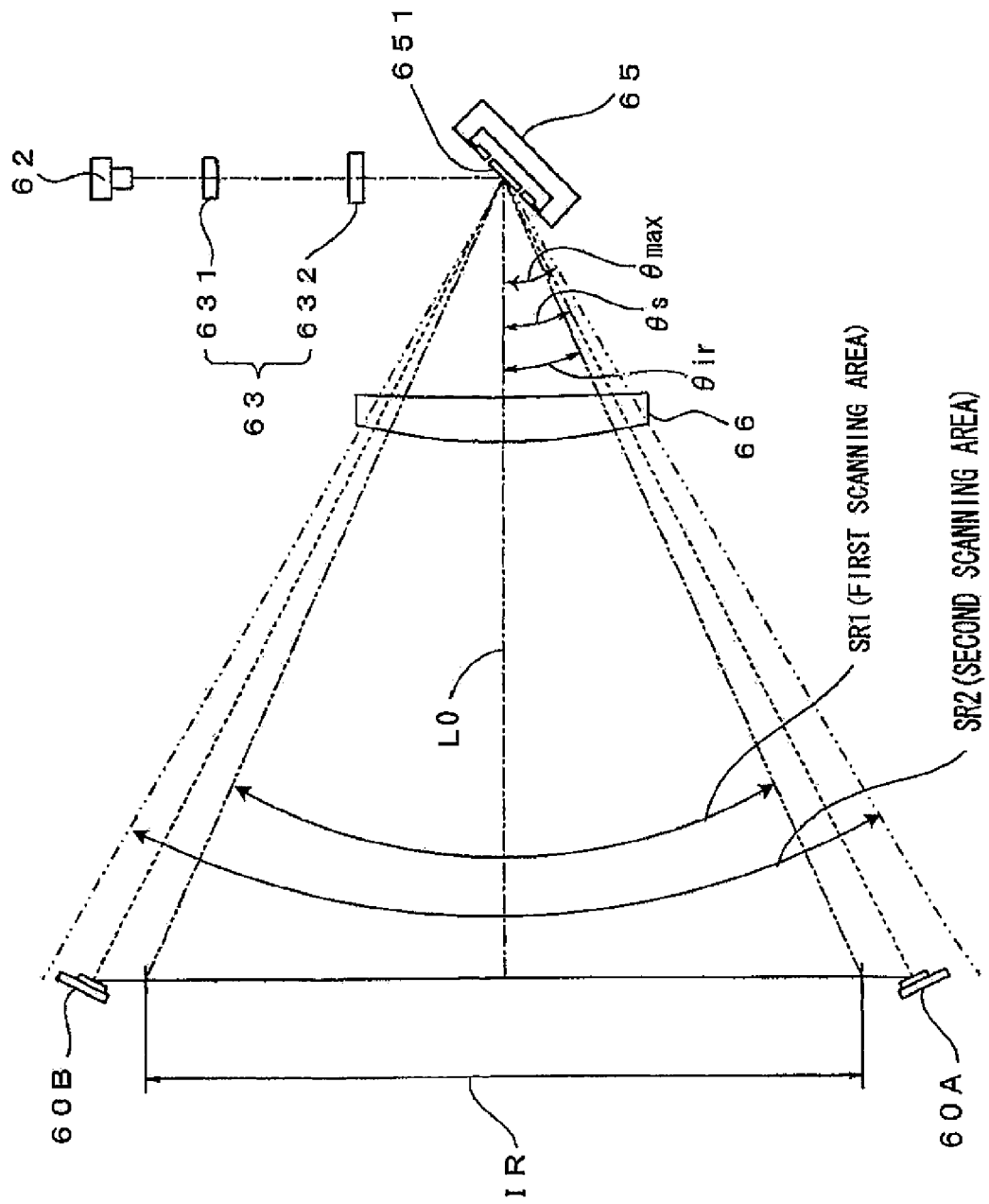
FIG. 4 is a diagram which shows a scanning area in the exposure unit.
Figure 5:
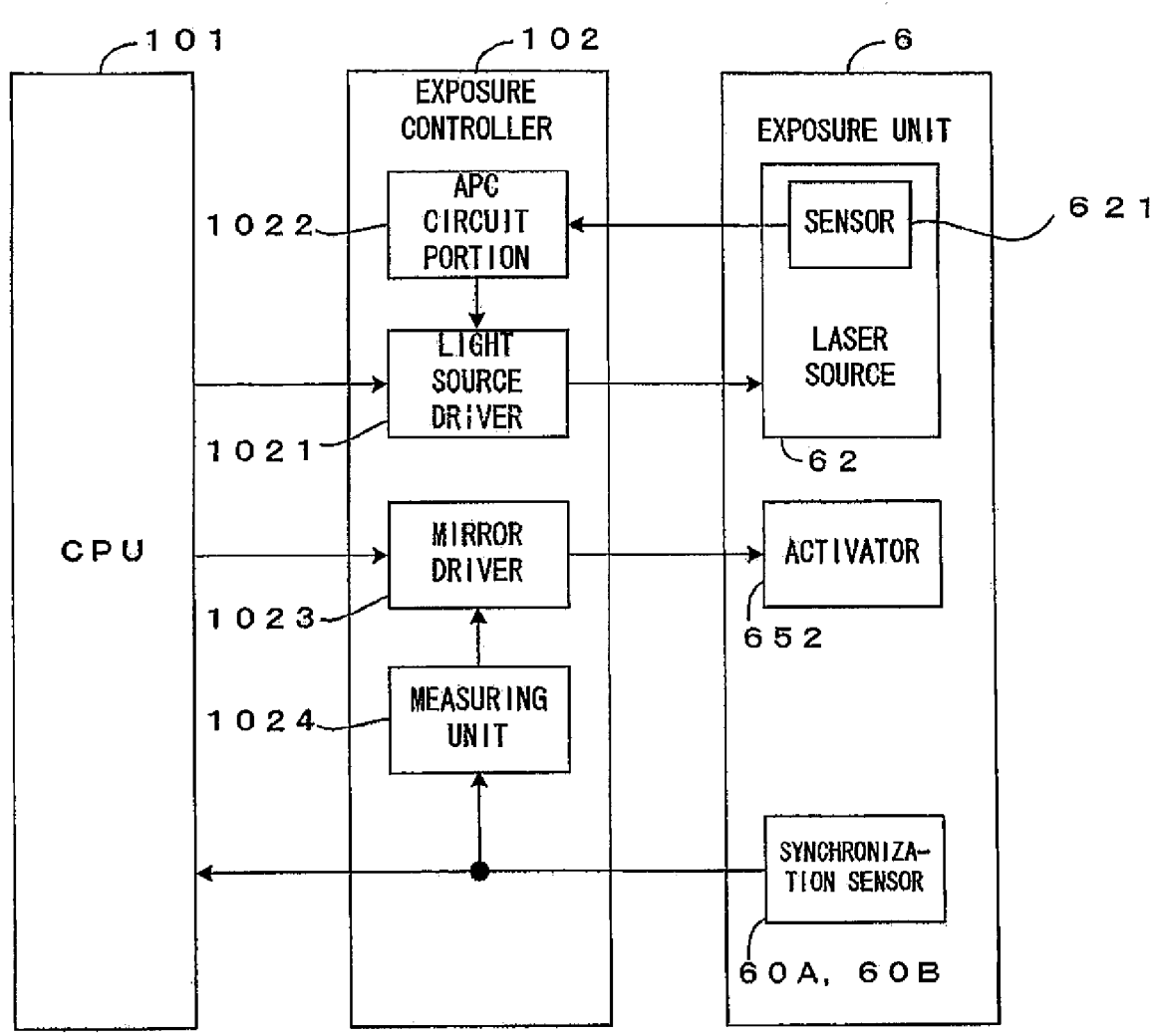
FIG. 5 is a diagram which shows the structures of the exposure unit and the exposure controller.

FIG. 3 is a main-scanning cross sectional view showing the structure of the exposure unit which is disposed in the image forming apparatus which is shown in FIG. 1. FIG. 4 is a diagram which shows a scanning area in the exposure unit. FIG. 5 is a diagram which shows the structures of the exposure unit and the exposure controller. The structure and operations of the exposure unit 6 will now be described in detail with reference to these drawings.

This exposure unit 6 comprises an exposure housing 61. A single laser source 62 is fixed to the exposure housing 61, permitting emission of a light beam from the laser source 62. The laser source 62 is electrically connected with a light source driver 1021 of an exposure controller 102 as shown in FIG. 5. The light source driver 1021 supplies a light source drive signal corresponding to an image signal to the laser source 62. ON/OFF of the laser source 62 is controlled based on the light source drive signal, whereby the light beam modulated in accordance with image data from the laser source 62 is emitted forward. Further, as described later, ON/OFF of the laser source 62 is controlled at the edges of a scanning area for APC control (adjustment of the amount of light) during acquisition of a horizontal synchronizing signal Hsync and successive formation of a latent line image, which also results in forward emission of the light beam from the laser source 62.

When emitting the light beam forward, the laser source 62 also emits toward the rear side a light beam for monitoring of the amount of light. A sensor 621 disposed inside a case for the laser source 62 receives this light beam. The sensor 621 is formed by a photo diode or the like and electrically connected with an APC circuit 1022 of the exposure controller 102. Hence, as the laser source 62 turns on, the light beam for exposure is emitted forward while the rear-emission light beam impinges upon the sensor 621 at the same time and a signal corresponding to the amount of the light beam is fed to the APC circuit 1022. The APC circuit 1022 compares a reference light amount set in advance with the amount of the light detected by the sensor 621, and controls the light source driver 1021 such that the amount of the light beam from the laser source 62 coincides with the reference light amount. In this embodiment, the APC circuit 1022 thus functions as the "light amount adjuster" of the invention.

Further, to make the light beam from the laser source 62 scan and expose the surface of the photosensitive member 2 (surface-to-be-scanned), a collimator lens 631, a cylindrical lens 632, a mirror 64, a deflector 65, a scanning lens 66 and a return mirror 68 are disposed inside the exposure housing 61. In other words, after shaped into collimated light of a proper size by the collimator lens 631, the light beam from the laser source 62 impinges upon the cylindrical lens 632 which has power only in a sub scanning direction Y. This collimated light is then converged only in the sub scanning direction Y and imaged in the shape of a line in the vicinity of a deflection mirror surface 651 of the deflector 65. In this embodiment, the collimator lens 631 and the cylindrical lens 632 thus function as a first optical system 63 which shapes the light beam from the laser source 62 into an elongated cross sectional shape which is long in a main scanning direction X and makes the light beam impinge upon the deflection mirror surface 651.

This deflector 65 is obtained using a micro machining technique which is an application of semiconductor manufacturing techniques and which aims at forming an integrated micro machine on a semiconductor substrate, and formed by an oscillation mirror which resonates. In other words, the deflector 65 is capable of, at its deflection mirror surface 651 which resonates, deflecting the light beam along the main scanning direction X. To be more specific, the deflection mirror surface 651 is axially supported such that it can freely oscillate about an oscillation shaft (torsion spring) which is approximately orthogonal to the main scanning direction X. When the deflection mirror surface 651 is subjected to external force exerted from an activator, the deflection mirror surface 651 oscillates about the oscillation shaft. The activator exerts electrostatic, electromagnetic or mechanical external force upon the deflection mirror surface 651 based on a mirror drive signal from a mirror driver 1023 of the exposure controller 102, thereby oscillating the deflection mirror surface 651 at the frequency of the mirror drive signal (FIG. 6). However, as shown in FIG. 6, the deflection mirror surface 651 oscillates after the time gap $\Delta$ Td from the receipt of the mirror drive signal. The activator may drive utilizing electrostatic absorption, electromagnetic force, mechanical force or the like, each driving method of which is already known and will not be described here.

The light beam deflected by the deflection mirror surface 651 of the deflector 65 heads toward a scanning lens 66 at a maximum angle of amplitude $\theta$max as shown in FIG. 4. In this embodiment, the scanning lens 66 is structured so that its F-value remains approximately the same across all of an effective image region IR of a photosensitive member 2. Hence, the light beam deflected toward the scanning lens 66 is imaged via the scanning lens 66 as spots having approximately identical diameters within the effective image region IR of the photosensitive member 2. In this manner, as the light beam scans parallel to the main scanning direction X, a latent image shaped like a line elongating in the main scanning direction X is formed in the effective image region IR on the photosensitive member 2. In this embodiment, a scanning area SR2 which is made scannable by the deflector 65 (the "second scanning area" of the invention) is wider than a scanning area SR1 within the effective image region IR where the light beam scans (the "the first scanning area" of the invention) as shown in FIG. 4. The first scanning area SR1 is located approximately at the center of the second scanning area SR2, and is approximately symmetrical with respect to an optical axis L0. In FIG. 4, the symbol $\theta$ir denotes the angle of amplitude of the deflection mirror surface 651 corresponding to the edges of the effective image region IR, and the symbol $\theta$s denotes the angle of amplitude of the deflection mirror surface 651 corresponding to horizontal synchronization sensors which will be described next.

Further, in this embodiment, as shown in FIG. 3, return mirrors 69a and 69b guide the scanning light beam to horizontal synchronization sensors 60A and 60B at the both ends of the scanning path of the scanning light beam. The return mirrors 69a and 69b are disposed respectively at the both edges of the second scanning area SR2, and within the second scanning area SR2, guide the scanning light beam to the horizontal synchronization sensors 60A and 60B whenever the scanning light beam exits the first scanning area SR1. Receiving the scanning light beam, the horizontal synchronization sensors 60A and 60B output signals upon arrival of the scanning light beam at the sensor positions (the angle of amplitude $\theta$s). The return mirrors 69a and 69b are approximately symmetrical with respect to the optical axis L0 as it is when the light beam scans an approximately center of the effective image region IR. It is therefore considered that the horizontal synchronization sensors 60A and 60B are disposed approximately symmetrical with respect to the optical axis.

The signals indicative of detection of the scanning light beam by the horizontal synchronization sensors 60A and 60B are transmitted to a measuring unit 1024 of the exposure controller 102, and this measuring unit calculates the scanning time in which the light beam scans the effective image region IR. The scanning time calculated by the measuring unit 1024 is transmitted to the mirror driver 1023. The mirror driver 1023 is capable of changing and setting a drive condition for the deflection mirror surface 651 in accordance with the transmitted scanning time. In addition, in this embodiment, the horizontal synchronization sensors 60A and 60B function as a horizontal synchronization reading sensor which is for obtaining a synchronizing signal based on which the light beam scans the effective image region IR along the main scanning direction X, namely, a horizontal synchronizing signal Hsync. The operation of sensing the scanning light beam performed by the horizontal synchronization sensors 60A and 60B will now be described in detail.

FIGS. 7A and 7B are drawings of the sensing operation of sensing the scanning light beam in the image forming apparatus which is shown in FIG. 1. FIG. 7A is a timing chart of the sensing operation near the sensors, while FIG. 7B is a drawing which schematically shows ON/OFF of the laser near the sensors. Although described below is the sensing operation by the sensor 60A in the scanning area, the sensing operation by the sensor. 60B is exactly the same.

While a latent image is being formed with the light beam scanning the effective image region IR on the photosensitive member 2 (time T1), the light source drive signal corresponding to the image signal is fed to the laser source 62 from the light source driver 1021 and the laser source 62 turns on in accordance with the image signal as described earlier. As a result, a latent image corresponding to the image signal is formed in the effective image region IR of the photosensitive member 2. As the scanning light beam moves passed the effective image region IR, the light source drive signal falls down to the L-level and the laser source 62 turns off. After this, the laser source 62 remains turned off immediately before the angle of amplitude of the deflection mirror surface 651 reaches $\theta$s (time T2).

The light source drive signal rises to the H-level after the time T2, so that the laser source 62 turns on. The deflection mirror surface 651 then makes the light beam (first light beam) from the laser source 62 scan, and the sensor 60A outputs the horizontal synchronizing signal Hsync when the light beam moves passed the sensor position (the angle of amplitude θs). The light source drive signal falls down to the L-level again after this sensor output, and the laser source 62 turns off (time T3). Following this, when the angle of amplitude of the deflection mirror surface 651 reaches the maximum angle of amplitude θmax, the deflection mirror surface 651 turns around (time T4). Over the time T5, the angle of amplitude of the deflection mirror surface 651 reaches the angle of amplitude θir. Throughout the time (T4+T5), the laser source 62 remains turned off.

The next latent image forming operation is thereafter started in response to the horizontal synchronizing signal Hsync described above. That is, in synchronization to the horizontal synchronizing signal Hsync, the light source drive signal corresponding to the image signal is supplied to the laser source 62 from the light source driver 1021 and the laser source 62 turns on in accordance with the image signal (time T6). As a result, a latent image corresponding to the image signal is formed in the effective image region IR of the photosensitive member 2.

As described above, in this embodiment, the deflection mirror surface 651 makes the light beam from the laser source 62 scan reciprocally along the main scanning direction X. At the end of the scanning light beam, the horizontal synchronization sensor 60A acquires a first detection signal. In other words, as shown in FIGS. 7A and 7B, when the scanning light beam (first light beam) which is traveling away from the effective image region IR moves passed the sensor position, the horizontal synchronizing signal Hsync is obtained as the first detection signal. The deflection mirror surface 651 then turns around, reversing the direction in which the scanning light beam scans. While this scanning light beam (second light beam) therefore scans the effective image region IR, the latent image forming operation with this scanning light beam is controlled based on the horizontal synchronizing signal Hsync. This ensures a relatively long time (T4+T5) since the acquisition of the horizontal synchronizing signal Hsync until the start of latent image formation based on the signal Hsync. It is therefore possible to take sufficient time for control of the latent image forming operation based on the horizontal synchronizing signal Hsync and execute the latent image forming operation favorably during the time T6.

The first detection signal may be detected with the laser source 62 remaining continuously turned on between the latent image forming operation (time T1) and the latent image forming operation (T6). It is a conscious choice that the laser source 62 turns on intermittently. To be more specific, in the first embodiment, the laser source 62 turns off after detection of the horizontal synchronizing signal Hsync which is the first detection signal, and during the time (T4+T5) which is before the start of light modulation, the laser source 62 remains turned off. As the laser source 62 turns on and off under control in this manner, an even more desirable latent image is formed. That is, the laser source 62 turns on only at the timing needed for detection of the horizontal synchronizing signal Hsync at a position outside the first scanning area SR1 (the angle of amplitude θ: θir<θ<θmax), but otherwise turns off. This prevents development of stray light at a position outside the first scanning area SR1 after detection of the horizontal synchronizing signal Hsync, and effectively suppresses formation of a ghost image. It is therefore possible to form a more favorable latent image within the effective image region IR.

Second Embodiment

Figure 8:
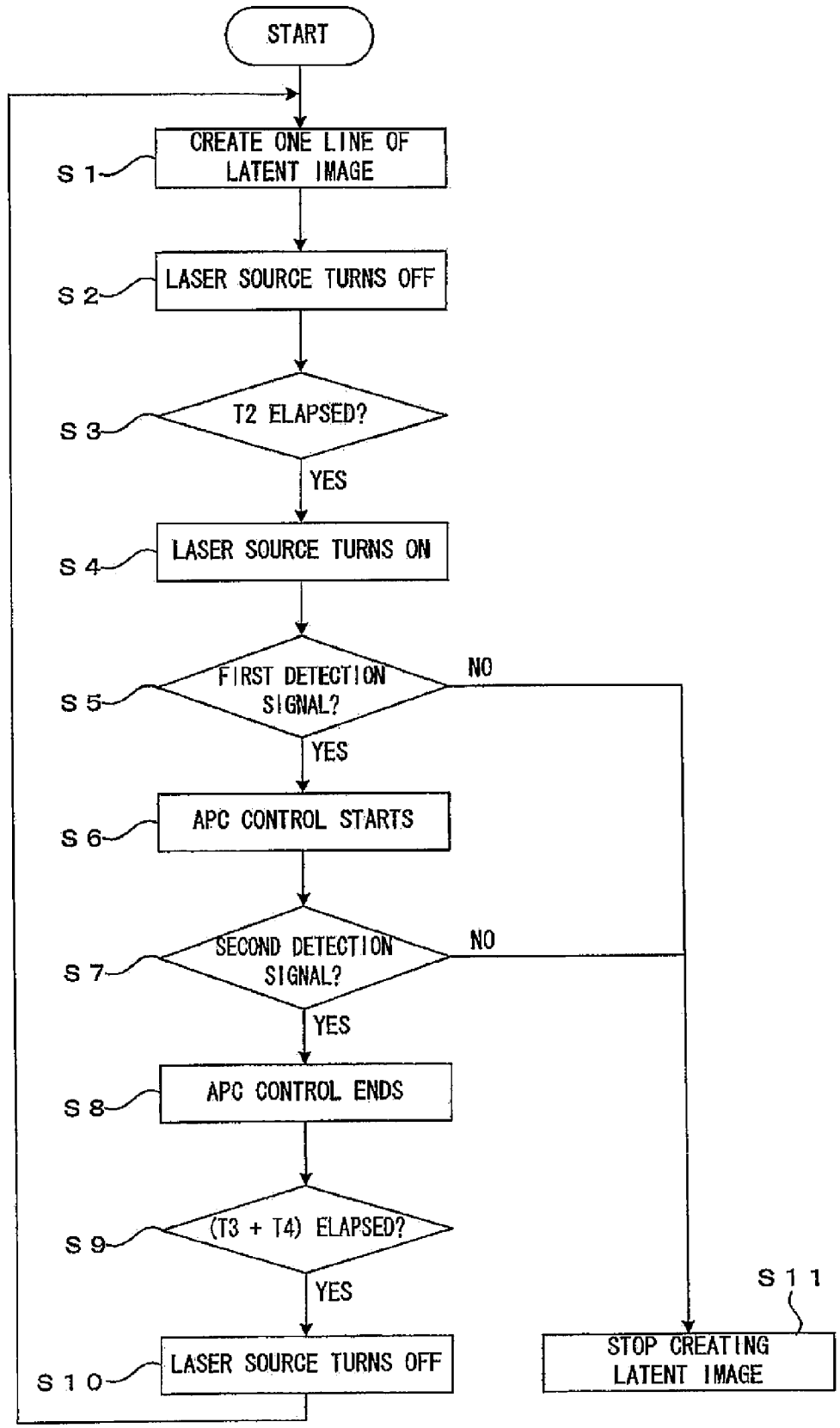
FIG. 8 is a flow chart of a latent image forming operation and a light amount adjusting operation performed in the second embodiment.

FIG. 8 is a flow chart of a latent image forming operation and a light amount adjusting operation performed in the second embodiment by the image forming apparatus according to the invention. FIGS. 9A and 9B are drawings of a sensing operation of sensing a scanning light beam and the light amount adjusting operation in the second embodiment, of which FIG. 9A is a timing chart of these operations near sensors, while FIG. 9B is a drawing which schematically shows ON/OFF of the laser near the sensors. Although described below is these operations by the sensor 60A, the operations by the sensor 60B are exactly the same. The basic structure of the apparatus is identical except for the mode of control, and therefore, the structure of the apparatus will not be described again but will be denoted at the same reference symbols.

In this embodiment, as the scanning light beam moves passed the effective image region IR after completion of the latent image forming operation for one line (Step S1), the light source drive signal falls down to the L-level and the laser source 62 turns off (Step S2). After the time T2 (Step S3), the laser source 62 remains turned off immediately before the angle of amplitude of the deflection mirror surface 651 reaches θs.

As the time T2 elapses, the light source drive signal rises to the H-level so that the laser source 62 turns on (Step S4). At this stage, when oscillations of the deflection mirror surface 651 are favorable ones, the light beam (first light beam) from the laser source 62 is made to scan by the deflection mirror surface 651, and the sensor 60A outputs the horizontal synchronizing signal Hsync as the first detection signal when the light beam moves passed the sensor position (the angle of amplitude θs). This results in the "YES" decision at Step S5 so that the sequence proceeds to Step S6 and the APC circuit 1022 starts APC control (adjustment of the amount of light). In other words, the APC circuit 1022 controls the light source driver 1021 to thereby coincide the detection signal from the sensor 621 of the laser source 62 with a reference light amount determined in advance.

Further, in this embodiment, the laser source 62 stays turned on (T3+T4) so as to continue the APC control. Detection of a second detection signal and the APC control are executed in the following manner. That is, after the scanning light beam has moved passed the sensor 60A, the deflection mirror surface 651 turns around at the maximum angle of amplitude θmax and reverses the direction in which the scanning light beam scans. The scanning light beam (second light beam) then starts traveling toward the effective image region IR, and the sensor 60A outputs the horizontal synchronizing signal Hsync as the second detection signal when this light beam moves passed the sensor position (the angle of amplitude θs). This yields "YES" at Step S7 so that the sequence proceeds to Step S8 and the APC control ends.

After the time (T3+T4) since turning on of the laser source 62 (Step S9), the light source drive signal falls down to the L-level and the laser source 62 turns off (time T5; Step S10). The sequence then returns to Step S1 and the next latent image forming operation is started based on the detection signal Hsync. In other words, in synchronization to the horizontal synchronizing signal Hsync, the light source drive signal corresponding to an image signal is fed to the laser source 62 from the light source driver 1021 and the laser source 62 turns on in accordance with the image signal (time T6). As a result, a latent image corresponding to the image signal is formed in the effective image region IR of the photosensitive member 2. The timing to start modulating the light may be controlled referring to either one of or both the first detection signal and the second detection signal.

In the event that oscillations of the deflection mirror surface 651 are not favorable, the decision is "NO" at Step S5, Step S7, etc. For instance, a change in the environment of use may change the resonant frequency of the deflector 65, in which case the resonant frequency will become different from the drive frequency and the oscillation amplitude may greatly decrease. This may further cause malfunction of the deflector 65. If the latent image forming operation is executed while oscillations of the deflection mirror surface 651 are undesirable, the quality of images will deteriorate. Noting this, in this embodiment, both the first detection signal and the second detection signal are detected for confirmation of desired oscillations of the deflection mirror surface 651, and the latent image forming operation is thereafter executed in the manner described above. When one of the first detection signal and the second detection signal is not detected ("NO" at Step S5, Step S7, etc.), adjustment of the amount of light and the latent image forming operation are stopped (Step S11). This is similar to the third embodiment which will be described later.

As described above, in this embodiment, the APC control (adjustment of the amount of light) is executed since formation of a latent line image until formation of another latent line image, thereby adjusting the amount of the light beam emitted from the laser source 62. In short, the light beam moves and scans over positions outside the effective image region IR (i.e., positions within the second scanning area SR2 but outside the first scanning area SR1) and the amount of the light from the laser source 62 is adjusted. The amount of the light beam L is thus adjusted while the light beam is successively scanning and a latent image is being formed within the effective image region IR, and therefore, the latent image is formed stably.

In addition, as shown in FIGS. 9A and 9B, when the light beam (first light beam) which is traveling away from the effective image region IR moves passed the sensor positions, the horizontal synchronizing signal Hsync is obtained as the first detection signal and the APC control is started in response to this. Further, the deflection mirror surface 651 turns around, thereby reversing the direction in which the scanning light beam scans, and the horizontal synchronizing signal Hsync is obtained as the second detection signal when this scanning light beam (second light beam) moves passed the sensor positions, thereby terminating the APC control. Hence, it is possible to precisely control the timing to start and end the light amount adjusting operation. Moreover, since the amount of the light is adjusted continuously while the light beam moves passed the sensor positions twice, it is possible to secure a long time for light amount adjustment and accurately adjust the amount of the light.

The next latent image forming operation is executed after confirming from the first and the second detection signals that the deflection mirror surface 651 is oscillating as desired. It is therefore possible to form a latent image always with the deflection mirror surface 651 oscillating favorably without fail. Further, occurrence of a malfunction is detected from these detection signals, and upon failure of confirming oscillations of the deflection mirror surface 651, the light amount adjusting operation and the latent image forming operation are stopped. This securely prevents execution of an inappropriate latent image forming operation and improper light amount adjusting operation.

Third Embodiment

Figure 10:
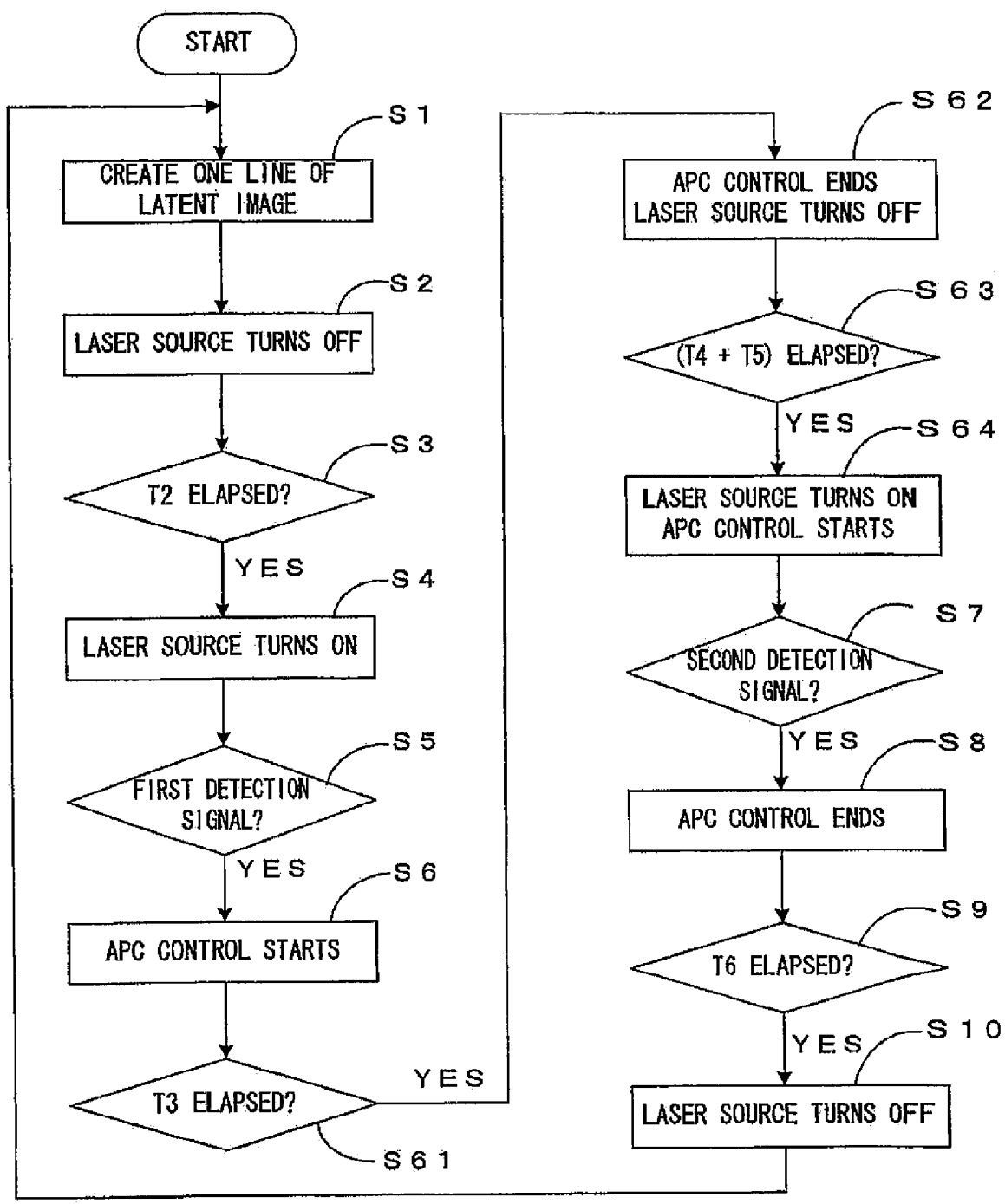
FIG. 10 is a flow chart of a latent image forming operation and a light amount adjusting operation performed in the third embodiment.

FIG. 10 is a flow chart of a latent image forming operation and a light amount adjusting operation performed in the third embodiment by the image forming apparatus according to the invention. FIGS. 11A and 11B are drawings of a sensing operation of sensing a scanning light beam and the light amount adjusting operation in the third embodiment. A major difference of the third embodiment from the second embodiment is that the laser source 62 turns on intermittently and the light amount adjusting operation is performed every time the light source turns on. In other words, in the third embodiment, as shown in FIGS. 11A and 11B, the laser source 62 is off while the angle of amplitude θ of the deflection mirror surface 651 satisfies the relationship below at a position outside the first scanning area SR1 (the angle of amplitude θ: θir<θ<θmax):

$$\theta s < \theta \leq \theta max$$

And the amount of light is adjusted before and after this period in which the laser source 62 turns off (T4+T5). To be more specific, the amount of the light is adjusted over two stages as described below. First, the APC control (adjustment of the amount of light) is started in a similar manner to that in the second embodiment. That is, as the scanning light beam moves passed the effective image region IR after completion of the latent image forming operation for one line (Step S1), the light source drive signal falls down to the L-level and the laser source 62 turns off (Step S2). After the time T2 (Step S3), the laser source 62 turns on (Step S4). The sensor 60A outputs the first detection signal Hsync as the light beam (first light beam) moves passed the sensor position (the angle of amplitude θs), and the APC circuit 1022 starts the APC control (adjustment of the amount of light) (Step S6).

The APC control continues until the time T3 elapses since turning on of the laser source 62 (Step S61), and the laser source 62 turns off at the same time as the end of the APC control (Step S62). The first light amount adjustment thus completes. To move on to the second light amount adjustment, the laser source 62 turns on after the time (T4+T5) (Step S63) and the APC control is started (Step S64) in this embodiment. At this stage, the deflection mirror surface 651 has already turned around and the scanning light beam (second light beam) is heading for the effective image region IR.

As in the second embodiment, the scanning light beam (second light beam) moves toward the effective image region IR, and when the scanning light beam moves passed the sensor position (the angle of amplitude θs), the sensor 60A outputs the horizontal synchronizing signal Hsync as the second detection signal. This results in the "YES" decision at Step S7 so that the sequence proceeds to Step S8 and the APC control ends.

After the time T6 since turning on of the laser source 62 (Step S9), the light source drive signal falls down to the L-level and the laser source 62 turns off (time T7; Step S10). The sequence then returns to Step S1 and the next latent image forming operation is started based on the detection signal Hsync. In other words, in synchronization to the detection signal Hsync, the light source drive signal corresponding to the image signal is fed to the laser source 62 from the light source driver 1021 and the laser source 62 turns on in accordance with the image signal (time T8). As a result, a latent image corresponding to the image signal is formed in the effective image region IR of the photosensitive member 2.

As described above, in the third embodiment as well, the amount of the light beam L is thus adjusted while the light beam is successively scanning and a latent image is being formed within the effective image region IR, and therefore, the latent image is formed stably, which is similar to the second embodiment. Further, since the third embodiment requires turning off the laser source 62 while the angle of amplitude θ of the deflection mirror surface 651 holds (θs<θ≦θmax), the latent image is formed even more favorably. In short, at a position outside the first scanning area SR1 (the angle of amplitude θ: θir<θ<θmax), the laser source 62 turns on only when needed for detection of the horizontal synchronizing signal Hsync and adjustment of the amount of light, but the laser source 62 remains otherwise turned off. This prevents development of stray light at a position outside the first scanning area SR1 after detection of the first detection signal Hsync, and effectively suppresses formation of a ghost image. It is therefore possible to form a more favorable latent image within the effective image region IR.

Although the APC control (adjustment of the amount of light) is executed over two stages in the third embodiment, either one of the two stages may be performed. Alternatively, the APC control may be executed over three or more stages.

Others

Figure 12:
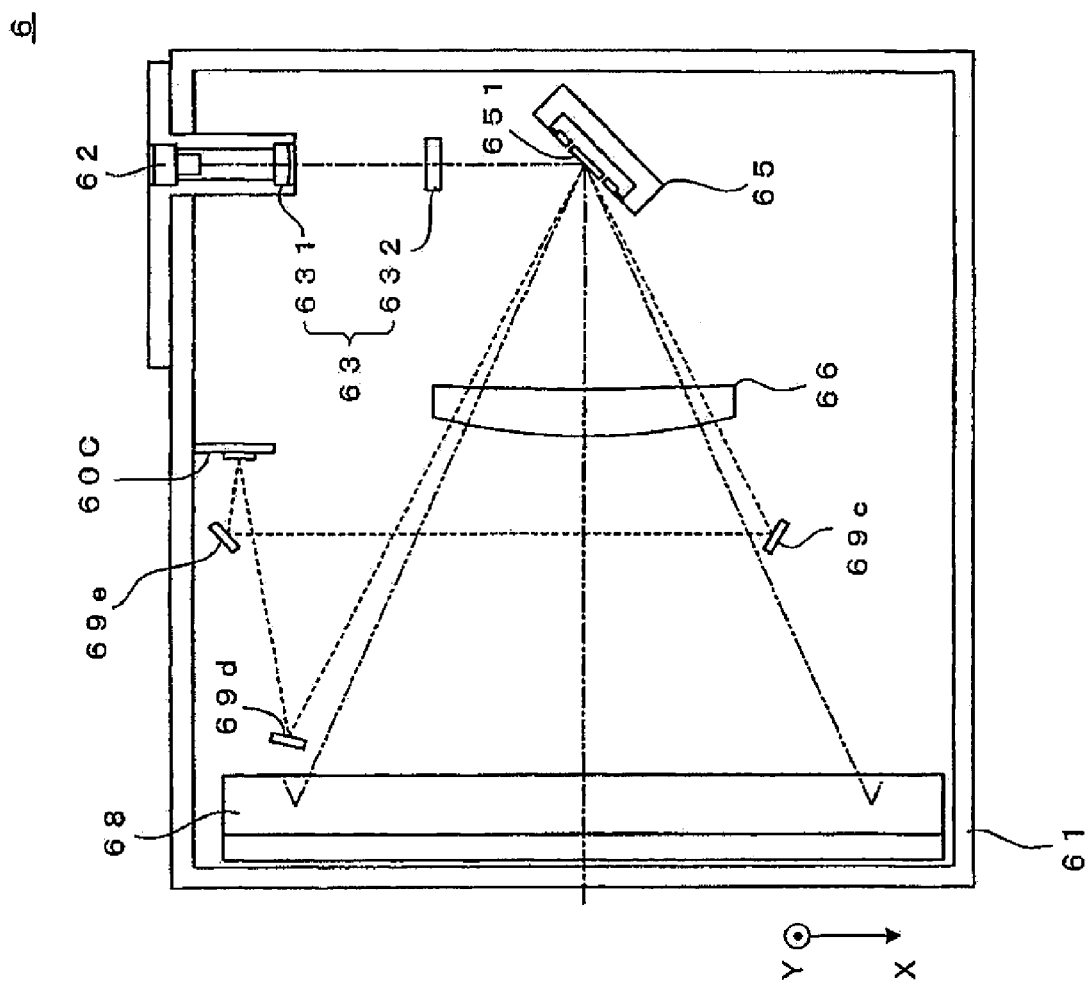
FIG. 12 is a drawing which shows one other embodiment of an image forming apparatus according to the present invention.

The present invention is not limited to the embodiments above, but may be modified in various manners in addition to the preferred embodiments above, to the extent not deviating from the object of the invention. For instance, although the sensors 60A and 60B are disposed at the both edges of the second scanning area SR2 in the first through the third embodiments above, the number and the arrangement of the sensors are not limited to this. As shown in FIG. 12 for instance, one horizontal synchronization sensor 60C and return mirrors 69c through 60e may be used for detection of the scanning light beam.

Further, although the deflection mirror surface 651 which oscillates is made using a micro machining technique in the embodiments above, the method of manufacturing the deflection mirror surface is not limited to this. The present invention is generally applicable to any image forming apparatus in which a deflection mirror surface which oscillates deflects a light beam and the light beam scans on a latent image carrier.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. An image forming apparatus comprising:
   a latent image carrier structured to carry a latent image in an image region;
   a latent image forming section which, using a deflection mirror which oscillates, deflects a light beam emitted from a light source reciprocally to scan a scanning area whose width in a main scanning direction is greater than that of the image region to form the latent image on the latent image carrier in the image region;
   a detector that outputs a first signal when the detector detects the light beam which moves away from the image region, and outputs a second signal when the detector detects the light beam which moves toward the image region; and
   a controller that controls a latent image forming operation based on the first signal and not on the second signal,
   wherein the controller makes the light source turn off after the first signal is outputted from the detector, keeps the light source turned off and makes the light source turn on again so that the second signal is outputted from the detector.

* * * * *